(12) United States Patent
Yamauchi et al.

(10) Patent No.: US 9,937,914 B2
(45) Date of Patent: Apr. 10, 2018

(54) HYBRID VEHICLE

(71) Applicant: TOYOTA JIDOSHA KABUSHIKI KAISHA, Toyota-shi, Aichi-ken (JP)

(72) Inventors: Tomokazu Yamauchi, Okazaki (JP); Koichi Nakae, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 57 days.

(21) Appl. No.: 15/076,935

(22) Filed: Mar. 22, 2016

(65) Prior Publication Data

US 2016/0280208 A1 Sep. 29, 2016

(30) Foreign Application Priority Data

Mar. 23, 2015 (JP) .................. 2015-059339

(51) Int. Cl.
*B60W 20/13* (2016.01)
*B60W 10/06* (2006.01)
(Continued)

(52) U.S. Cl.
CPC .............. *B60W 20/13* (2016.01); *B60K 6/26* (2013.01); *B60K 6/28* (2013.01); *B60K 6/387* (2013.01); *B60K 6/48* (2013.01); *B60K 6/547* (2013.01); *B60W 10/06* (2013.01); *B60W 10/08* (2013.01); *B60K 2006/4808* (2013.01); *B60K 2006/4825* (2013.01); *B60Y 2200/92* (2013.01); *B60Y 2300/60* (2013.01); *B60Y 2300/91* (2013.01);
(Continued)

(58) Field of Classification Search
CPC ... B60K 6/44; B60K 6/52; B60K 6/28; B60K 6/387; B60K 6/48; B60K 6/547; B60K 6/26; B60K 2006/4825; B60K 6/54; B60L 11/12; B60L 1/003; B60L 1/02; B60L 7/12; B60L 7/14; B60L 11/005; B60L 11/14; B60W 10/08; B60W 20/13; B60W 10/06; B60W 10/26; B60W 20/00; Y02T 10/623; Y02T 10/6265; Y02T 10/7005; Y02T 10/7077; Y02T 10/62; Y02T 10/6221; Y02T 10/7022; Y02T 10/70; Y10S 903/93; Y10S 903/903; B60Y 2200/92; B60Y 2300/60; B60Y 2300/91; B60Y 2400/20; B60Y 2400/602
USPC .......... 701/1, 37, 22; 280/5.5; 318/139, 154, 318/440
See application file for complete search history.

(56) References Cited

U.S. PATENT DOCUMENTS

| 2006/0232238 A1* | 10/2006 | Horii | ................... | B60K 6/28 320/104 |
| 2007/0296358 A1* | 12/2007 | Sato | ................... | B60K 6/44 318/139 |

FOREIGN PATENT DOCUMENTS

| JP | 2006-280110 | 10/2006 |
| JP | 2011-160530 A | 8/2011 |

\* cited by examiner

*Primary Examiner* — Nga X Nguyen
(74) *Attorney, Agent, or Firm* — Finnegan, Henderson, Farabow, Garrett & Dunner, LLP

(57) ABSTRACT

A DC/DC converter is driven when an inter-terminal voltage of a low-voltage battery is lower than a determination voltage and an engine is started when the inter-terminal voltage becomes lower than a determination voltage during the driving of the DC/DC converter so that an alternator is driven at a predetermined driving point at which the alternator can be efficiently driven and the DC/DC converter is controlled such that the inter-terminal voltage of the low-voltage battery becomes a rated voltage. Energy efficiency can be improved since the alternator is efficiently driven.

1 Claim, 6 Drawing Sheets

(51) Int. Cl.
*B60W 10/08* (2006.01)
*B60K 6/26* (2007.10)
*B60K 6/28* (2007.10)
*B60K 6/387* (2007.10)
*B60K 6/48* (2007.10)
*B60K 6/547* (2007.10)

(52) U.S. Cl.
CPC ..... *B60Y 2400/20* (2013.01); *B60Y 2400/602* (2013.01); *Y02T 10/626* (2013.01); *Y02T 10/6221* (2013.01); *Y02T 10/6252* (2013.01); *Y10S 903/93* (2013.01)

HYBRID VEHICLE

INCORPORATION BY REFERENCE

The disclosure of Japanese Patent Application No. 2015-059339 filed on Mar. 23, 2015 including the specification, drawings and abstract is incorporated herein by reference in its entirety.

BACKGROUND OF THE INVENTION

1. Field of the Invention

The invention relates to a hybrid vehicle and, more particularly, to a hybrid vehicle that is provided with an engine capable of outputting power for traveling, a motor capable of outputting power for traveling, a first battery connected to a first electric power line to which the motor is connected, an automotive electrical instrument, a second battery connected to a second electric power line to which the automotive electrical instrument is connected, a DC/DC converter transforming electric power of the first electric power line and supplying the transformed electric power of the first electric power line to the second electric power line, and an alternator supplying electric power generated by driving by the engine to the second electric power line.

2. Description of Related Art

In the related art, a hybrid vehicle that is provided with an engine, a motor, a high-voltage battery, an automotive electrical component, a low-voltage battery, a DC/DC converter, and an alternator is disclosed as this type of hybrid vehicle (for example, refer to Japanese Patent Application Publication No. 2006-280110). The engine and the motor output power for traveling. The high-voltage battery supplies electric power to the motor. The low-voltage battery supplies electric power to the automotive electrical component. The DC/DC converter steps down the electric power from the high-voltage battery and supplies the electric power to the low-voltage battery and the automotive electrical component. The alternator is driven by the engine. The alternator supplies generated electric power to the low-voltage battery and the automotive electrical component. In this apparatus, the electric power that is supplied from the DC/DC converter is supplied to the low-voltage battery and the automotive electrical component when the amount of electric power consumption by the automotive electrical component is not so large. When the automotive electrical component consumes a large amount of electric power, electric power that can be output from the DC/DC converter is supplied and the electric power that is generated by the alternator is supplied to the automotive electrical component and the low-voltage battery along with this electric power. Accordingly, even when the automotive electrical component consumes a large amount of electric power, a sufficient amount of electric power can be supplied to the automotive electrical component and the low-voltage battery and the low-voltage battery can be sufficiently charged.

The above-described hybrid vehicle, however, causes a reduction in energy efficiency in some cases. In general, the alternator has a low level of efficiency at a low output current level. Accordingly, when the portion of the electric power consumption by the automotive electrical component that is not compensated for by the electric power from the DC/DC converter is supplied from the alternator, the chance of the driving of the alternator at the low output current level increases and the energy efficiency is reduced.

SUMMARY OF THE INVENTION

The invention provides as hybrid vehicle that is capable of improving energy efficiency when a low-voltage battery is charged.

A hybrid vehicle according to an aspect of the invention includes an engine configured to output power for traveling, a motor configured to output power for traveling, a first battery connected to a first electric power line to which the motor is connected, an automotive electrical instrument, a second battery connected to a second electric power line to which the automotive electrical instrument is connected, a DC/DC converter transforming electric power of the first electric power line and supplying the transformed electric power of the first electric power line to the second electric power line, an alternator supplying electric power generated by driving by the engine to the second electric power line, and an electronic control unit configured to execute a first control for controlling the DC/DC converter and the alternator such that electric power is supplied from the DC/DC converter to the second electric power line by the alternator being stopped when an electric power storage ratio of the second battery or an inter-terminal voltage of the second battery is lower than a predetermined threshold and configured to execute a second control for controlling the DC/DC converter and the alternator such that the electric power from the DC/DC converter and the electric power from the alternator are supplied to the second electric power line when the electric power storage ratio of the second battery or the inter-terminal voltage of the second battery is reduced from the predetermined threshold during the execution of the first control. The electronic control unit is configured to control, in the second control, the DC/DC converter and the alternator such that the electric power from the DC/DC converter and the electric power from the alternator are supplied to the second electric power line while the alternator is driven at a predetermined driving point for efficient driving.

In the aspect described above, the electronic control unit is configured to execute the first control for controlling the DC/DC converter and the alternator such that the electric power is supplied from the DC/DC converter to the second electric power line by the alternator being stopped when the electric power storage ratio of the second battery or the inter-terminal voltage of the second battery is lower than the predetermined threshold and configured to execute the second control for controlling the DC/DC converter and the alternator such that the electric power from the DC/DC converter and the electric power from the alternator are supplied to the second electric power line when the electric power storage ratio of the second battery or the inter-terminal voltage of the second battery is reduced from the predetermined threshold during the execution of the first control. Accordingly, a low-voltage battery can be charged while electric power consumption by the automotive electrical instrument is covered. In the second control, the DC/DC converter and the alternator are controlled for the supply of the electric power from the DC/DC converter and the electric power from the alternator to the second electric power line while the alternator is driven at the predetermined driving point for efficient driving. Accordingly, the low-voltage battery can be charged while the electric power consumption by the automotive electrical instrument is covered. At this time, energy efficiency can be improved because the alternator is efficiently driven. The "electric power storage ratio" is a ratio of the capacity of actual storage to the full storage capacity of the second battery, The "predetermined threshold" is a threshold for initiating the charging of the low-voltage battery.

In the aspect described above the predetermined driving point may have a predetermined output voltage and a predetermined output current within a current range in which the alternator is efficiently driven. The electronic control unit may be configured to control, in the second control, the DC/DC converter such that the inter-terminal voltage of the second battery becomes a predetermined voltage. The energy efficiency can be improved by the electric power determined based on a predetermined current and a predetermined voltage being supplied to the second electric power line from the alternator during the efficient driving of the alternator. The "predetermined output voltage" can be a rated voltage of the second battery. The "predetermined output current" can be a maximum current allowed to be supplied by the DC/DC converter.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described.

Figure 1:
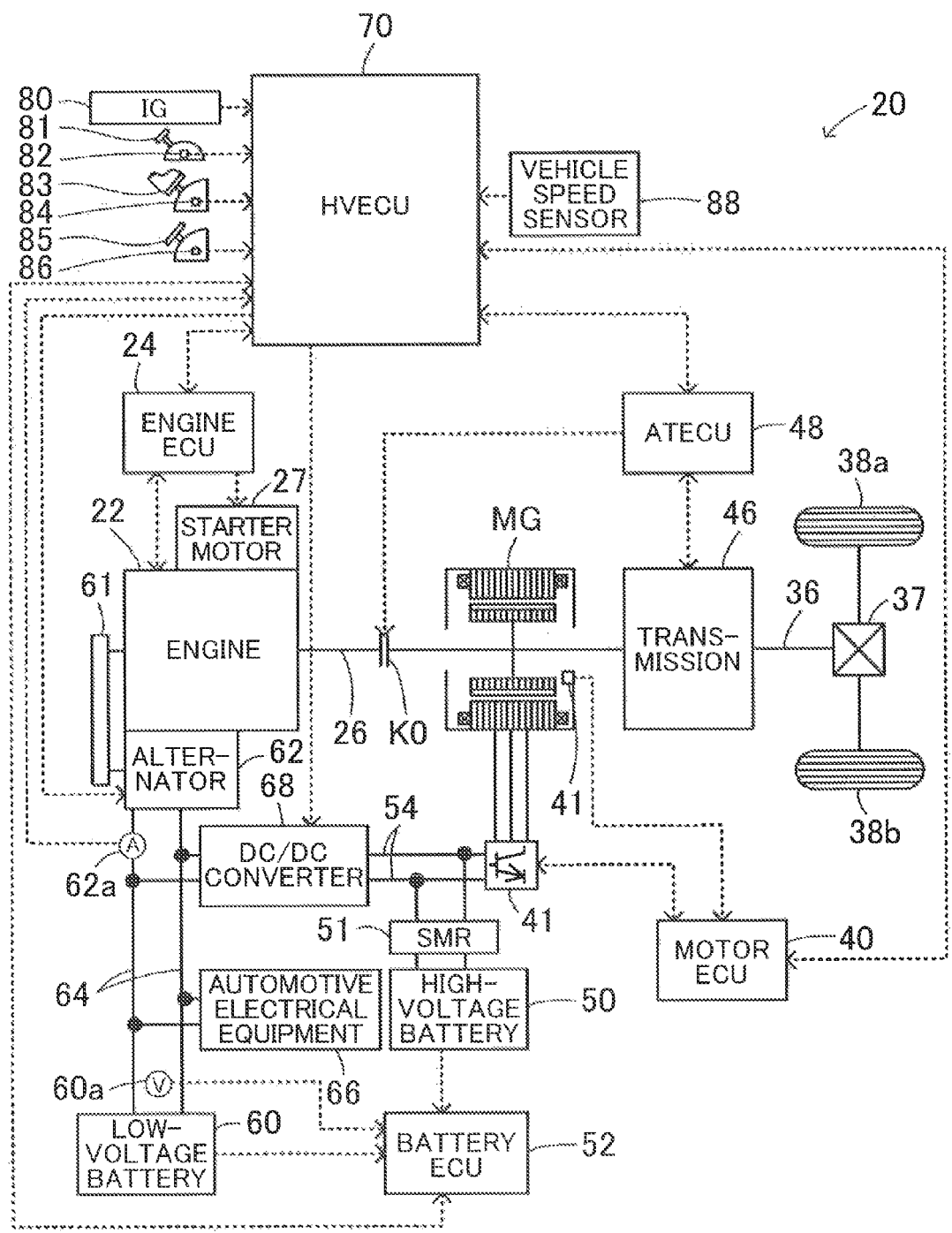
FIG. 1 is a configuration diagram illustrating a schematic configuration of a hybrid car 20 according to an embodiment of the invention.

FIG. 1 is a configuration diagram illustrating a schematic configuration of a hybrid car 20 according to an embodiment of the invention, in which a battery charging device is mounted. As illustrated in the drawing, the hybrid car 20 according to this embodiment is provided with an engine 22, a motor MG, an inverter 41, a transmission 46, a high-voltage battery 50, a low-voltage battery 60, an alternator 62, automotive electrical equipment 66, a DC/DC converter 68, and a hybrid electronic control unit (hereinafter referred to as a HVECU) 70.

The engine 22 is configured as an internal combustion engine that outputs power by using a fuel such as gasoline and diesel oil. The engine 22 suctions air that is purified by an air cleaner via a throttle valve and injects the fuel from a fuel injection valve to mix the air with the gasoline. Then, this air-fuel mixture is suctioned into a combustion chamber via an intake valve. The engine 22 causes the suctioned air-fuel mixture to be subject to explosive combustion by a spark plug-based electric spark, and converts a reciprocating motion of a piston pushed down by the energy to a rotary motion of a crankshaft 26. An operation of this engine 22 is controlled by an engine electronic control unit (hereinafter, referred to as an engine ECU) 24.

The engine ECU 24 is configured as a microprocessor (not illustrated) that has a CPU as a main component. The engine ECU 24 is provided with a ROM that stores a processing program, a RAM that temporarily stores data, input and output ports, and a communication port in addition to the CPU. Signals from various sensors that are required for the control of the operation of the engine 22 are input to the engine ECU 24 from the input port. Examples of the signals from the various sensors can include the followings. A crank angle θcr from a crank position sensor that detects a rotational position of the crankshaft 26 of the engine 22. A throttle opening degree TH from a throttle valve position sensor that detects a throttle valve position. Various control signals for controlling the operation of the engine 22 are output from the engine ECU 24 via the output port. Examples of the various control signals can include the followings. A drive signal from the fuel injection valve. A drive signal toward a throttle motor that adjusts the throttle valve position. A control signal toward an ignition coil that is integrated with an igniter. The engine ECU 24 is connected to the HVECU 70 via the communication port. This engine ECU 24 controls the operation of the engine 22 with a control signal from the HVECU 70. if necessary, the engine ECU 24 outputs data relating to an operation state of the engine 22 to the HVECU 70. The engine ECU 24 calculates a rotation speed of the crankshaft 26, that is, a rotation speed Ne of the engine 22 based on the crank angle θcr detected by the crank position sensor.

The motor MG is configured as, for example, a synchronous generator motor. A rotor of this motor MG is connected to the crankshaft 26 of the engine 22 via a clutch K0. The inverter 41 is connected to a high-voltage system electric power line 54. The motor MG is driven to rotate by a switching element (not illustrated) of the inverter 41 being subject to switching control by a motor electronic control unit (hereinafter, referred to as a motor ECU) 40.

The motor ECU 40 is configured as a microprocessor (not illustrated) that has a CPU as a main component. The motor ECU 40 is provided with a ROM that stores a processing program, a RAM that temporarily stores data, input and output ports, and a communication port in addition to the CPU. Signals from various sensors that are required for the control of the driving of the motor MG are input to the motor ECU 40 from the input port. Examples of the signals from the various sensors can include the followings. A rotational position θm1 from a rotational position detection sensor 43 that detects a rotational position of the rotor of the motor MG A phase current from a current sensor that detects a current flowing through each phase of the motor MG. A switching control signal toward the switching element (not illustrated) of the inverter 41 or the like is output from the motor ECU 40 via the output port. The motor ECU 40 is connected to the HVECU 70 via the communication port. This motor ECU 40 controls the driving of the motor MG with a control signal from the HVECU 70. If necessary, the motor ECU 40 outputs data relating to a driving state of the motor MG to the HVECU 70. The motor ECU 40 calculates a rotation speed Nm of the motor MG based on the rotational position θm of the rotor of the motor MG detected by the rotational position detection sensor 43.

The transmission 46 is configured as an automatic transmission that has a torque converter and a multistage transmission mechanism. The transmission 46 is connected to the rotor of the motor MG and is connected to drive wheels 38a, 38b via a drive shaft 36 and a differential gear 37. The transmission 46 is controlled by an automatic transmission electronic control unit (hereinafter, referred to as an ATECU) 48.

The ATECU 48 is configured as a microprocessor (not illustrated) that has a CPU as a main component. The ATECU 48 is provided with a ROM that stores a processing program, a RAM that temporarily stores data, input and output ports, and a communication port in addition to the CPU. A signal that is required for the control of the transmission 46 is input to the ATECU 48, Various controls signals toward the transmission 46 or the like are output from the ATECU 48 via the output port. Examples of the various control signals can include the followings. A control signal toward a lock-up clutch of the torque converter. A shift control signal toward the multistage transmission. A control signal toward the clutch K0. The ATECU 48 is connected to the HVECU 70 via the communication port. This ATECU 48 controls the shift of the transmission 46 with the shift control signal from the HVECU 70. If necessary, the ATECU 48 outputs data relating to a state of the transmission 46 to the HVECU 70.

The high-voltage battery 50 is configured as, for example, a lithium-ion secondary battery or a nickel-hydrogen secondary battery. The high-voltage battery 50 is connected to the high-voltage system electric power line 54 via a system main relay (SMR) 51 and exchanges electric power with the motor MG via the inverter 41. The high-voltage battery 50 is managed by a battery electronic control unit (hereinafter, referred to as a battery ECU) 52.

The low-voltage battery 60 is configured as, for example, a lead storage battery with a rated voltage lower than that of the high-voltage battery 50. The low-voltage battery 60 is connected to a low-voltage system electric power line 64 with the automotive electrical equipment 66, the alternator 62, and the DC/DC converter 68. The low-voltage battery 60 is managed by the battery ECU 52.

The automotive electrical equipment 66 includes a plurality of electrical instruments such as an air-conditioning device and an audio system. As described above, the automotive electrical equipment 66 are connected to the low-voltage system electric power line 64.

The battery ECU 52 is configured as a microprocessor (not illustrated) that has a CPU as a main component. The battery ECU 52 is provided with a ROM that stores a processing program, a RAM that temporarily stores data, input and output ports, and a communication port in addition to the CPU. Signals from various sensors that are required for the management of the high-voltage battery 50 and the low-voltage battery 60 are input to the battery ECU 52 via the input port. Examples of the signals from the various sensors can include the followings. An inter-terminal voltage Vbh from a voltage sensor that is placed between terminals of the high-voltage battery 50. An inter-terminal voltage Vbl from a voltage sensor 60a that is placed between terminals of the low-voltage battery 60. The battery ECU 52 is connected to the HVECU 70 via the communication port.

If necessary, the battery ECU 52 outputs data relating to a state of the high-voltage battery 50 to the HVECU 70.

The alternator 62 is connected to the crankshaft 26 of the engine 22 via a belt 61. The alternator 62 performs electric power generation with the power of, the engine 22 and supplies the generated electric power to the low-voltage system electric power line 64. The alternator 62 is controlled by the HVECU 70.

The DC/DC converter 68 is connected to the high-voltage system electric power line 54 and the low-voltage system electric power line 64. The DC/DC converter 68 steps down the electric power from the motor MG via the inverter 41 and the electric power from the high-voltage battery 50 and supplies the electric power to the low-voltage system electric power line 64. The DC/DC converter 68 is controlled by the HVECU 70.

The HVECU 70 is configured as a microprocessor (not illustrated) that has a CPU as a main component. The HVECU 70 is provided with a ROM that stores a processing program, a RAM that temporarily stores data, input and output ports, and a communication port in addition to the CPU. Signals from various sensors are input to the HVECU 70 via the input port. Examples of the signals from the various sensors can include the followings. An ignition signal from an ignition switch 80. A shift position SP from a shift position sensor 82 that detects an operation position of a shift lever 81. An accelerator opening degree Acc from an accelerator pedal position sensor 84 that detects a depression amount of an accelerator pedal 83. A brake pedal position BP from a brake pedal position sensor 86 that detects a depression amount of a brake pedal 85. A vehicle speed V from a vehicle speed sensor 8$. An output current Ialt from a current sensor 62a that detects an output current of the alternator 62. As described above, the HVECU 70 is connected to the engine. ECU 24, the motor ECU 40, the ATECU 48, and the battery ECU 52 via the communication port. The HVECU 70 exchanges various control signals and data with the engine ECU 24, the motor ECU 40, the ATECU 48, and the battery ECU 52.

The hybrid car 20 according to this embodiment that has the above-described configuration travels by shifting the power from the motor MG with the transmission 46 in a state where the operation of the engine 22 is stopped with the clutch K0 OFF (disconnected) or travels with the power from the engine 22 and the power from the motor MG with the clutch K0 ON (connected).

Figure 2:
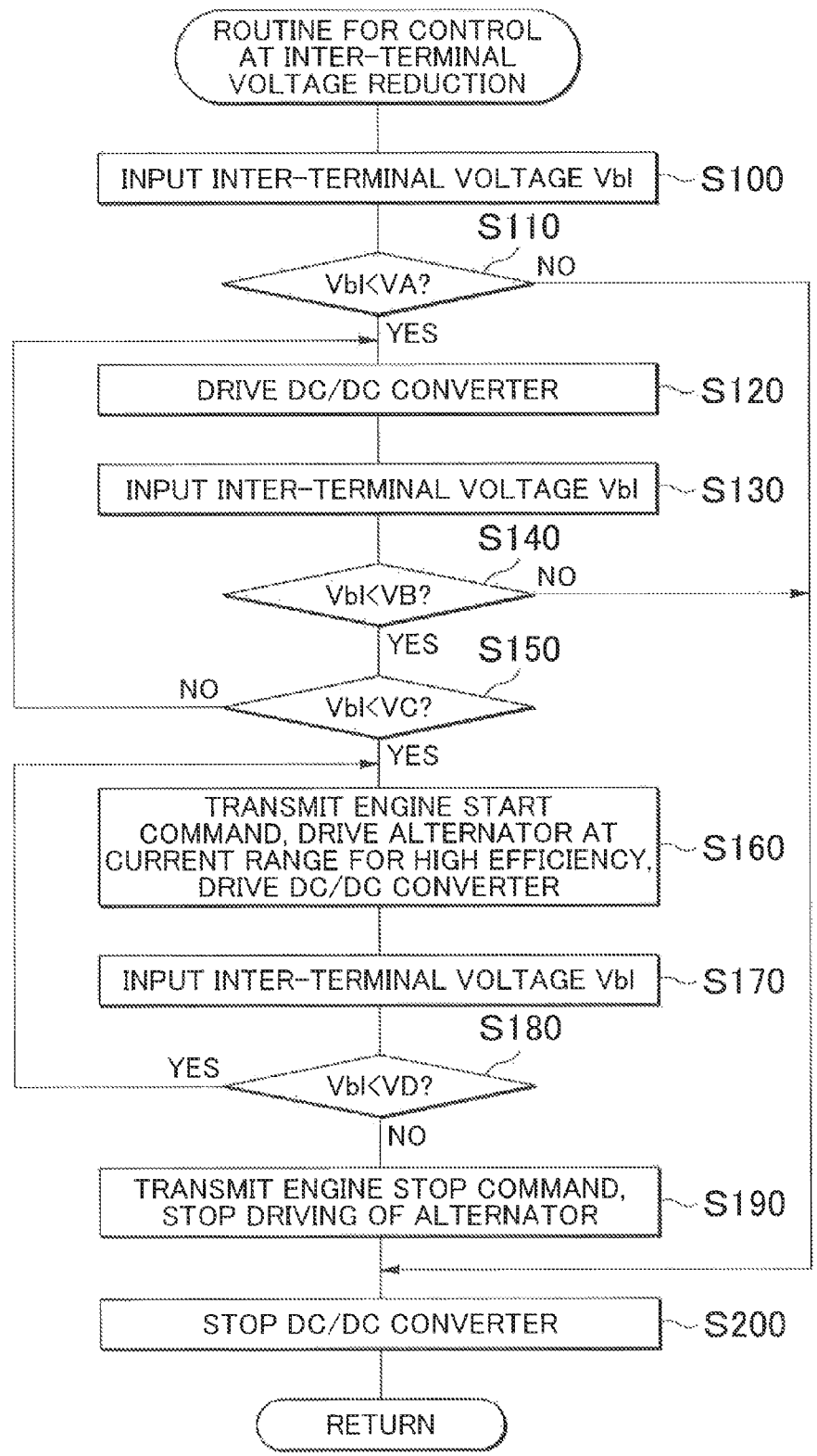
FIG. 2 is a flowchart illustrating an example of a routine for control at inter-terminal voltage reduction that is executed by a HVECU 70.

Hereinafter, an operation of the hybrid car 20 according to this embodiment that has the above-described configuration, an operation at a time when the low-voltage battery 60 has a reduced inter-terminal voltage in particular, will be described. FIG. 2 is a flowchart illustrating an example of a routine for control at inter-terminal voltage reduction that is executed by the HVECU 70, This routine is executed when the hybrid car 20 travels with the power from the motor MG in a state where the operation of the engine 22 is stopped with the clutch K0 OFF (disconnected) and the driving of the alternator 62 and the DC/DC converter 68 is stopped.

Upon this routine being executed, the HVECU 70 executes a processing for inputting the inter-terminal voltage Vbl of the low-voltage battery 60 (Step S100), The inter-terminal voltage Vbl is input by communication from the battery ECU 52 after being detected by the voltage sensor 60a.

Then, the input inter-terminal voltage Vbl is compared to a determination threshold VA (Step S110). Herein, the determination threshold VA is a threshold for determining Whether or not to initiate charging of the low-voltage battery

60. The determination threshold VA is a voltage that is slightly lower than the rated voltage of the low-voltage battery 60.

When the inter-terminal voltage Vbl is equal to or higher than the determination threshold VA (Step S110), it is determined that the charging of the low-voltage battery 60 does not have to be initiated. Then, the driving of the DC/DC converter 68 remains stopped (Step S200), and this routine is terminated.

When the inter-terminal voltage Vbl is lower than the determination threshold VA (Step S110), it is determined that the low-voltage battery 60 is required to be charged. Then, the driving of the DC/DC converter 68 is initiated, and the DC/DC converter 68 is controlled such that the inter-terminal voltage Vbl of the low-voltage battery 60 becomes the rated voltage within a range of a maximum supply capacity Pmax of the DC/DC converter 68 (Step S120). A reason for driving the DC/DC converter 68 without driving the alternator 62 will be described below.

Figure 3:
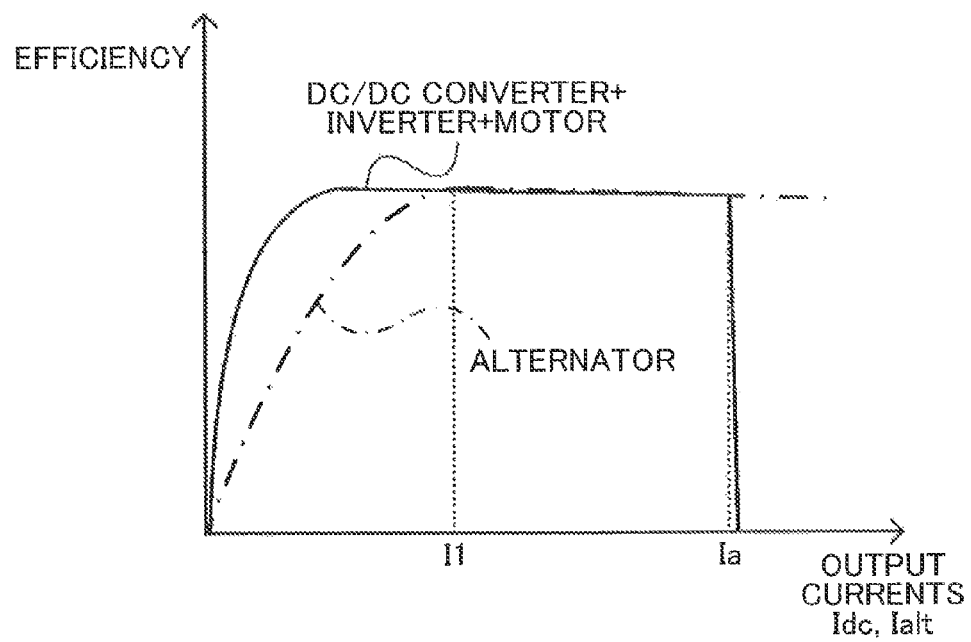
FIG. 3 is an explanatory drawing illustrating a relationship between an output current Idc of a DC/DC converter 68 and efficiency of an electric power supply system including the DC/DC, converter 68, an inverter 41, and a motor MG and a relationship between an output current Ialt of an alternator 62 and the efficiency.

FIG. 3 is an explanatory drawing illustrating a relationship between an output current Idc of the DC/DC converter 68 (current supplied to the low-voltage system electric power line 64 by the DC/DC converter 68) and efficiency of an electric power supply system including the DC/DC converter 68, the inverter 41, and the motor MG and a relationship between the output current Ialt of an alternator 62 (current supplied to the low-voltage system electric power line 64 by the alternator 62) and the efficiency. The solid line in the drawing shows the relationship between the output current Idc and the efficiency of the electric power supply system including the DC/DC converter 68, the inverter 41, and the motor MG The one-dot chain line in the drawing shows the output current Ialt and the efficiency. As illustrated in the drawing, in a low-current region where the output current is lower than a current I1, a current output from the DC/DC converter 68 results in a higher level of efficiency than a current output from the alternator 62. Accordingly, when it is determined that the low-voltage battery 60 needs to be charged, the DC/DC converter 68 is first driven, for improvement in energy efficiency, without the alternator 62 being driven.

After the DC/DC converter 68 is driven as described above, the inter-terminal voltage Vbl of the low-voltage battery 60 is input (Step S130) in a processing similar to Step S100, and the inter-terminal voltage Vbl is compared to a determination threshold VB (Step S140). The determination threshold VB is a threshold for determining whether or not to continue to charge the low-voltage battery 60. In this embodiment, the determination threshold VB has the same value as the determination threshold VA or has a value that is slightly higher than the determination threshold VA.

When the inter-terminal voltage Vbl is equal to or higher than the determination threshold VB (Step S140), it is determined that the charging of the low-voltage battery 60 does not have to be continued. Then, the driving of the DC/DC converter 68 is stopped (Step S200), and this routine is terminated.

When the inter-terminal voltage Vbl is lower than the determination threshold YB (Step S140), it is determined that the low-voltage battery 60 cannot be charged because of a large amount of electric power consumption by the automotive electrical equipment 66, and the inter-terminal voltage Vbl is compared to a determination threshold VC (Step S150). The determination threshold VC is a threshold for determining the presence or absence of a case where the inter-terminal voltage Vbl of the low-voltage battery 60 can be recovered by the driving of the DC/DC converter 68 alone. The determination threshold VC is a value that is lower than the determination threshold VB.

When the inter-terminal voltage Vbl is equal to or higher than the determination threshold VC (Step S150), it is determined that the case where the inter-terminal voltage Vbl of the low-voltage battery 60 can he recovered by the driving of the DC/DC converter 68 alone is present. Then, the processing returns to Step S120, the processing of Step S120 to S150 is repeated, and the driving of the DC/DC converter 68 is allowed to continue. Then, when the inter-terminal voltage Vbl becomes equal to or higher than the determination threshold VB in the processing of Step S140, the driving of the DC/DC converter 68 is stopped (Step S200) and this routine is terminated.

When the inter-terminal voltage Vbl is lower than the determination threshold VC (Step S150), it is determined that the inter-terminal voltage Vbl of the low-voltage battery 60 cannot be recovered by the driving of the DC/DC converter 68 alone because of a large amount of electric power consumption by the automotive electrical equipment 66. Then, an engine start command is transmitted to the engine ECU 24, and the alternator 62 and the DC/DC converter 68 are controlled such that the electric power from the alternator 62 and the electric power from the DC/DC converter 68 are supplied to the low-voltage system electric power line 64 (Step S160), Upon receiving the engine start command, the engine ECU 24 executes a control for initiating the operation by starting the engine 22 with a starter motor 27. Herein, the alternator 62 is controlled to be driven at a predetermined driving point that has a predetermined voltage Va. and a predetermined current Ia. The DC/DC converter 68 is controlled such that the inter-terminal voltage Vbl of the low-voltage battery 60 becomes the rated voltage. Herein, the predetermined voltage Va is a voltage that is slightly higher than the rated voltage of the low-voltage battery 60. As illustrated in FIG. 3, the predetermined current Ia is a current value that is determined in advance as a current equal to or higher than the current Ia within a range in which the alternator 62 is efficiently driven (such as a maximum supply current Imax which can be supplied from the DC/DC converter 68). In this manner, the shortfall of the electric power for charging the low-voltage battery 60 can be supplied from the DC/DC converter 68 while the alternator 62 is efficiently driven, the electric power determined based on the predetermined current Ia and the predetermined voltage Va is supplied to the low-voltage system electric power line 64 from the alternator 62, and the electric power consumption by the automotive electrical equipment 66 is covered. Accordingly, the low-voltage battery 60 can he charged. Hereinafter, a reason for driving the alternator 62 at the predetermined driving point will be described.

Figure 4:
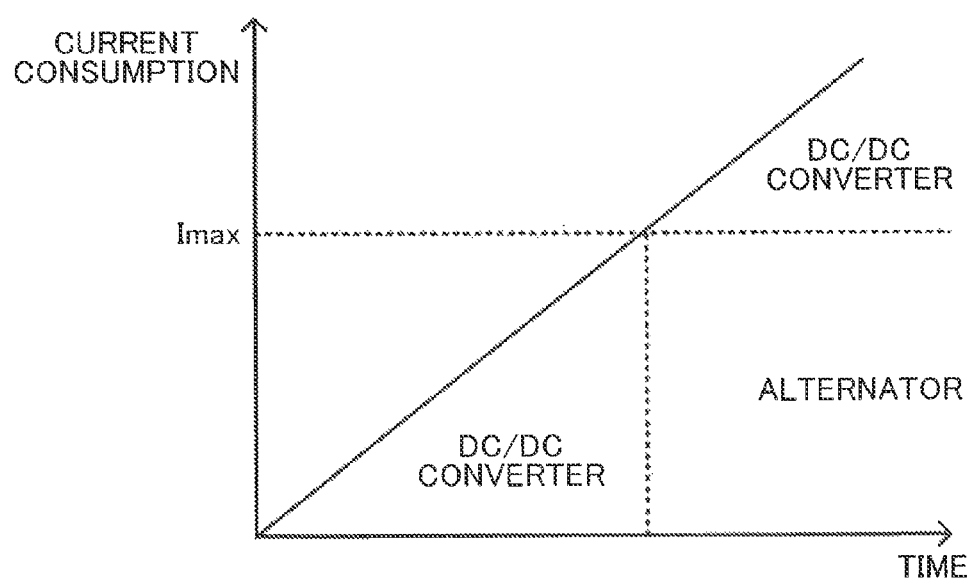
FIG. 4 is an explanatory drawing for showing a driving region of the DC/DC converter 68 and a driving region of the alternator 62 at a time when current consumption by automotive electrical equipment 66 rises in the embodiment.
Figure 5:
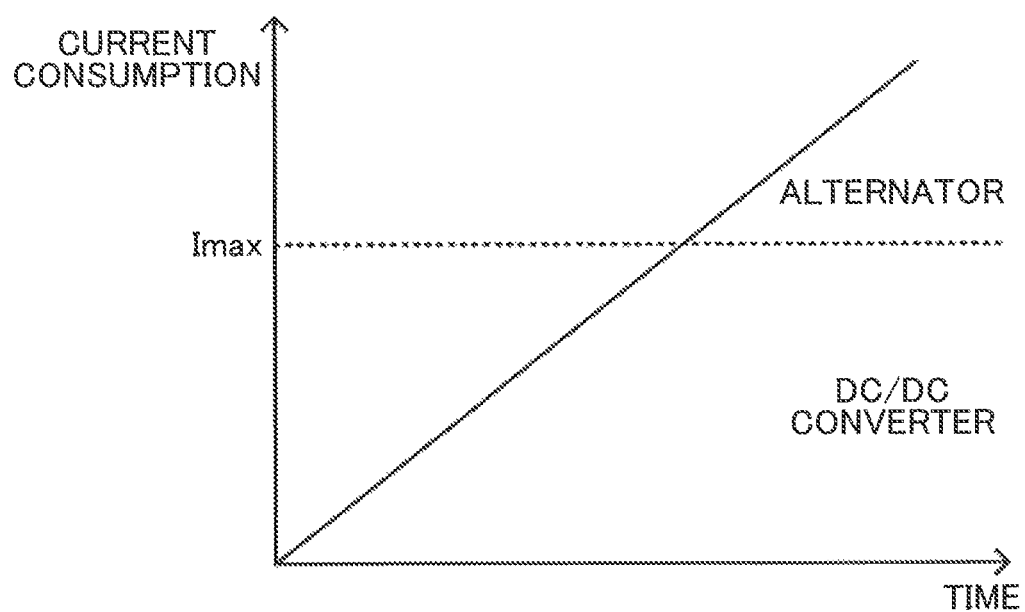
FIG. 5 is an explanatory drawing for showing the driving region of the DC/DC converter 68 and the driving region of the alternator 62 at a time when the current consumption by the automotive electrical equipment 66 rises in a comparative example.

FIG. 4 is an explanatory drawing for showing current consumption by the automotive electrical equipment 66, a driving region of the DC/DC converter 68 and a driving region of the alternator 62 according to this embodiment. FIG. 5 is an explanatory drawing for showing the driving region of the DC/DC converter 68 and the driving region of the alternator 62 at a time when the current consumption by the automotive electrical equipment 66 rises in a comparative example. In the comparative example, when the inter-terminal voltage Vbl of the low-voltage battery 60 is lower than the determination threshold VC, the DC/DC converter 68 is controlled so that the current of the maximum supply current Imax is output from the DC/DC converter 68 and the alternator 62 is controlled so that the shortfall of the electric power for charging the low-voltage battery 60 is supplied from the alternator 62 while the electric power consumption by the automotive electrical equipment 66 is compensated for by the electric power from the DC/DC converter 68.

In the embodiment and the comparative example, the low-voltage battery 60 is charged, while the electric power consumption by the automotive electrical. equipment 66 is covered by the electric power supplied from the DC/DC converter 68, until the current consumption by the automotive electrical equipment 66 reaches the maximum supply current Imax of the DC/DC converter 6$ as illustrated in FIGS, 4 and 5.

When the current consumption by the automotive electrical equipment 66 is at least the maximum supply current Imax, the current consumption by the automotive electrical equipment 66 cannot be covered by the DC/DC converter 68 alone and the shortfall is supplied from the low-voltage battery 60. Accordingly, the inter-terminal voltage Vbl of the low-voltage battery 60 is reduced. In the embodiment and the comparative example, the alternator 62 and the DC/DC converter 68 are driven such that the low-voltage battery 60 is charged while the current shortfall is compensated for as illustrated in FIGS. 4 and 5. At this time, in the comparative example, the DC/DC converter 68 is driven at the maximum supply current Imax and the shortfall current not covered by current supplied from the DC/DC converter 68 is supplied from the alternator 62 as illustrated in FIG. 5. Accordingly, the chance of low-current driving of the alternator 62 increases. In this embodiment, the alternator 62 is efficiently driven by the output current Ialt being used as the predetermined current Ia, and the shortfall of the current (electric power) is supplied from the DC/DC converter 68. Accordingly, the chance of low-current driving of the DC/DC converter 68 increases. As illustrated in FIG. 3, in the low-current region, the driving of the DC/DC converter 68 results in a higher level of efficiently than the driving of the alternator 62, and thus the overall energy efficiently can he more improved than in the comparative example. As described above, the energy efficiency can he improved by the alternator 62 being driven at the predetermined driving point.

After the alternator 62 and the DC/DC converter 68 are driven as described above, the inter-terminal voltage Vbl is input (Step S170) as in the processing of Step S100, and the input inter-terminal voltage Vbl is compared to a determination threshold VD (Step S180). The determination threshold VD has the same value as the determination threshold VB. Accordingly, the processing of Step S180 is a processing for determining whether or not to continue to charge the low-voltage battery 60.

When the inter-terminal voltage Vbl is lower than the determination threshold VD (Step S170), the processing returns to Step S160 and the processing of Step S160 to S180 is repeated. When the inter-terminal voltage Vbl is equal to or higher than the determination threshold VD (Step S170), it is determined that the charging of the low-voltage. battery 60 does not have to he continued. Then, an engine stop command is transmitted to the engine ECU 24, the driving of the alternator 62 is stopped (Step S190), the driving of the DC/DC converter 68 is stopped (Step S200), and this routine is terminated.

In the hybrid car 20 according to this embodiment, the DC/DC converter 68 and the alternator 62 are controlled such that the electric power from the DC/DC converter 68 and the electric power from the alternator 62 are supplied to the low-voltage system electric power line 64, while the alternator 62 is driven at the predetermined driving point for efficient driving, when the inter-terminal voltage Vbl is lower than the determination threshold VC. Accordingly, the energy efficiency during the charging of the low-voltage battery 60 can be improved.

The alternator 62 is controlled to be driven at the predetermined driving point that has the predetermined current Ia which is equal to or higher than the current I1 for the efficient driving of the alternator 62 and the determination threshold VA. The DC/DC converter 68 is controlled so that the inter-terminal voltage Vbl of the low-voltage battery 60 becomes the rated voltage. Accordingly, the electric power that is determined based on the predetermined current Ia and the predetermined voltage Va is supplied to the low-voltage system electric power line 64 from the alternator 62 while the alternator 62 is efficiently driven, and thus the energy efficiency can be improved.

In the hybrid car 20 according to this embodiment, the inter-terminal voltage Vbl of the low-voltage battery 60 is compared to the determination voltages VA to VD. However, an electric power storage ratio SOCl of the low-voltage battery 60 (ratio of the capacity of actual storage to the full storage capacity of the low-voltage battery 60) may be actually calculated from an integrated value of the battery current of the low-voltage battery 60 and the calculated electric power storage ratio SOCl may be compared to determination thresholds SA to SD.

Figure 6:
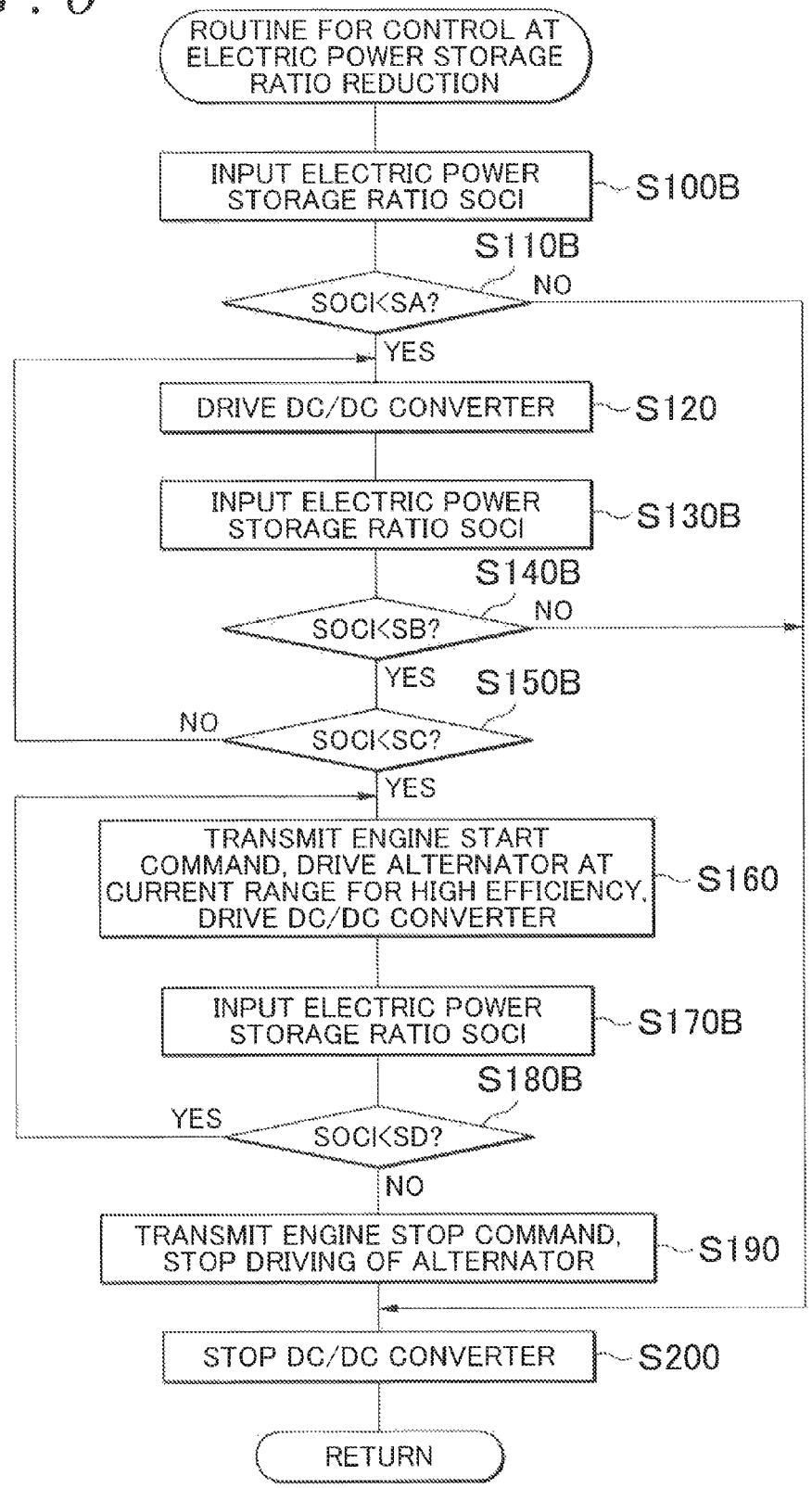
FIG. 6 is a flowchart illustrating an example of a routine for control at electric power storage ratio reduction that is executed by the HVECU 70.

In this case, it is desirable that a routine for control at electric power storage ratio reduction that is exemplified in FIG. 6 is executed instead of the routine for control at inter-terminal voltage reduction that is exemplified in FIG. 2. The routine for control at electric power storage ratio reduction will be described below In the routine for control at electric power storage ratio reduction, the same processing as the routine for control at inter-terminal voltage reduction in FIG. 2 is executed except that Step S100B, S110B, S130B to S150B, S170B, and S180B are executed instead of the processing of Step S100, S110, S130 to S150, S170, and S180 of the routine for control at inter-terminal voltage reduction exemplified in FIG. 2. Accordingly, the same reference numerals will be used to refer to the same processing as the routine for control at inter-terminal voltage reduction in FIG. 2, and description thereof will be omitted herein.

In the routine for control at electric power storage ratio reduction, the electric power storage ratio SOCl is input (Step S100B) and the electric power storage ratio SOCl is compared to the determination threshold SA (Step S110B). When the electric power storage ratio SOCl is equal to or higher than the determination threshold SA, it is determined that the charging of the low-voltage battery 60 does not have to be initiated. Then, the processing proceeds to Step S200. When the electric power storage ratio SOCl is lower than the determination threshold SA, it is determined that the low-voltage battery 60 needs to be charged, and the processing of Step S120 is executed. The determination threshold SA that is used herein may be, for example, a rated capacity of the low-voltage battery 60 converted to an electric power storage ratio.

After the execution of the processing of Step S120, the electric power storage ratio SOCl is input (Step S130B) and the electric power storage ratio SOCl is compared to the determination threshold SB (Step S140B). When the electric power storage ratio SOCl is equal to or higher than the determination threshold SB, it is determined that the charging of the low-voltage battery 60 does not have to be continued. Then, the processing proceeds to Step 5200. When the electric power storage ratio SOCl is lower than the determination threshold SB, the processing proceeds to Step S150B. The determination threshold SB may have the same value as the determination threshold SA or may have a value that is slightly higher than the determination threshold SA.

In the processing of Step S150B, the electric power storage ratio SOCl is compared to the determination threshold SC (Step S150B). When the electric power storage ratio SOCl is equal to or higher than the determination threshold SC, it is determined that a case where the inter-terminal voltage Vbl of the low-voltage battery 60 can be recovered by the driving of the DC/DC converter 68 alone is present. Then, the processing returns to Step S120. When the electric power storage ratio SOCl is lower than the determination threshold SC, the processing proceeds to Step S160. The determination threshold SC may be a value that is lower than the determination threshold. SB.

After the execution of the processing of Step S160, the electric power storage ratio SOCl is input (Step S170B) and the electric power storage ratio SOCl is compared to the determination threshold SD (Step S180B). When the electric power storage ratio SOCl is lower than the determination threshold SD, the processing returns to Step S160, When the electric power storage ratio SOCl is equal to or higher than the determination threshold SD, the processing proceeds to Step S190. The determination threshold SD may have the same value as the determination threshold SB.

In the hybrid car 20 according to the embodiment, the DC/DC converter 68 is controlled in the processing of Step S160 such that the inter-terminal voltage Vbl of the low-voltage battery 60 becomes the rated voltage. However, the DC/DC converter 68 may also be controlled such that the voltage of the low-voltage system electric power line 64 becomes a predetermined voltage VL. In this case, it is preferable that the predetermined voltage VL is a value allowing the inter-terminal voltage Vbl of the low-voltage battery 60 to become the rated voltage in view of a voltage drop in the low-voltage system electric power line 64, examples of which include a value that is slightly higher than the rated voltage of the low-voltage battery 60.

In the hybrid car 20 according to this embodiment, the automatic transmission that has the multistage transmission mechanism is used as the transmission 46. However, a manual transmission may be used instead and a continuously variable transmission such as a CVT may be used instead.

Figure 7:
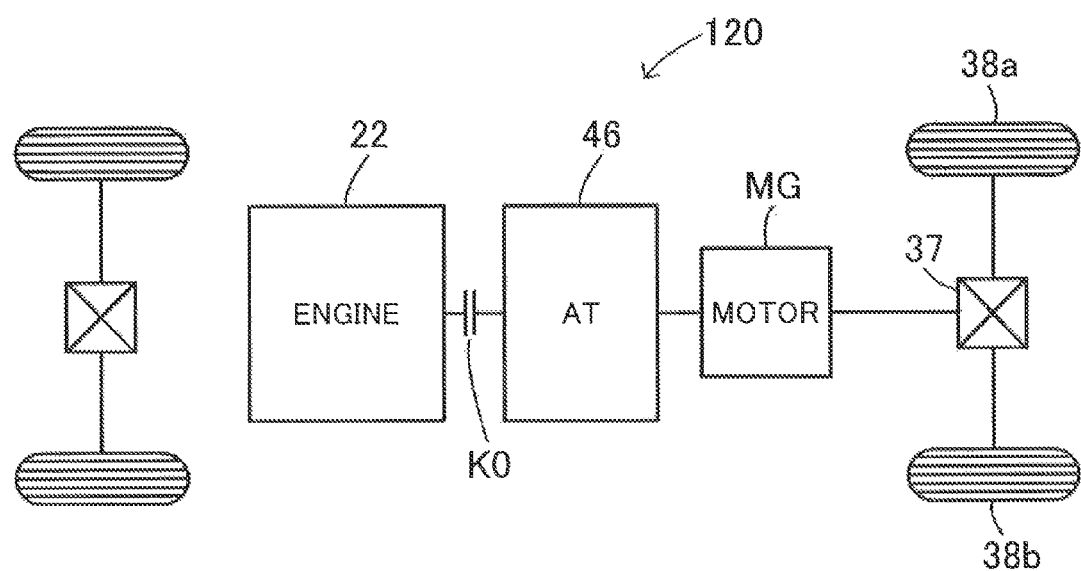
FIG. 7 is a configuration diagram illustrating a schematic configuration of a hybrid car 120 according to a modification example.

In the hybrid car 20 according to this embodiment, the transmission 46 is provided between the motor MG and the drive shaft 36. However, the transmission 46 may be provided between the clutch K0 and the motor MG as in the hybrid car 120 according to the modification example illustrated in FIG. 7.

A correspondence relationship between main elements of the embodiment and main elements of the invention described in the SUMMARY OF THE INVENTION will be described below. The engine 22 according to the embodiment corresponds to the "engine", the motor MG according to the embodiment corresponds to the "motor", the high-voltage battery 50 according to the embodiment corresponds to the "first battery", the automotive electrical equipment 66 according to the embodiment correspond to the "automotive electrical instrument", the low-voltage battery 60 according to the embodiment corresponds to the "second battery", the DC/DC converter 68 according to the embodiment corresponds to the "DC/DC converter", the alternator 62 according to the embodiment corresponds to the "alternator", and the HVECU 70 according to the embodiment corresponds to the "control means".

The correspondence relationships of the main elements of the invention described in the SUMMARY OF THE INVENTION and the main elements of the embodiments are specific examples illustrating an implementation of the invention, and the elements of the invention are not limited thereto. In other words, the invention is to be interpreted on the basis of the description in the SUMMARY OF THE INVENTION, while the embodiment is merely a specific example of the invention.

The invention was described above using embodiment thereof, but the invention is not limited in any way to this embodiment, and may of course be implemented in various embodiments within a scope that does not depart from the spirit of the invention.

The invention may be used in the hybrid vehicle manufacturing industry and so on.

What is claimed is:

1. A hybrid vehicle comprising:
   an engine configured to output power for traveling;
   a motor configured to output power for traveling;
   a first battery connected to a first electric power line to which the motor is connected;
   an automotive electrical instrument;
   a second battery connected to a second electric power line to which the automotive electrical instrument is connected;
   a DC/DC converter transforming electric power of the first electric power line and supplying the transformed electric power of the first electric power line to the second electric power line;
   an alternator supplying electric power generated by driving by the engine to the second electric power line; and
   an electronic control unit
   i) configured to execute a first control for controlling the DC/DC converter and the alternator such that electric power is supplied from the DC/DC converter to the second electric power line by the alternator being stopped when an electric power storage ratio of the second battery or an inter-terminal voltage of the second battery is lower than a first predetermined threshold, and
   ii) configured to execute a second control for controlling the DC/DC converter and the alternator such that the electric power from the DC/DC converter and the electric power from the alternator are supplied to the second electric power line when the electric power storage ratio of the second battery or the inter-terminal voltage of the second battery is lower than a second predetermined threshold during the execution of the first control, the second predetermined threshold being lower than the first predetermined threshold,
   wherein the electronic control unit is configured to control, in the second control, the DC/DC converter and the alternator such that the electric power from the DC/DC converter and the electric power from the alternator are supplied to the second electric power line while the alternator is driven at a predetermined driving point for efficient driving,
   the predetermined driving point has a predetermined output voltage and a predetermined output current within a current range in which the alternator is efficiently driven,
   the electronic control unit is configured to control, in the second control, the DC/DC converter such that the inter-terminal voltage of the second battery becomes the first predetermined voltage,
   the predetermined output voltage is a rated voltage of the second battery, and the predetermined output current is a maximum current allowed to be supplied by the DC/DC converter.

* * * * *